(12) United States Patent
Hibino et al.

(10) Patent No.: US 6,492,787 B1
(45) Date of Patent: Dec. 10, 2002

(54) SPEED REDUCER WITH ROTATION DETECTOR

(75) Inventors: Toshiharu Hibino, Mie (JP); Takahiro Maekawa, Mie (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/621,893

(22) Filed: Jul. 20, 2000

(30) Foreign Application Priority Data

Jul. 23, 1999 (JP) .......................................... 11-208971

(51) Int. Cl.[7] .............................................. G05B 19/19
(52) U.S. Cl. .............................. 318/568.11; 318/568.21; 310/83; 901/29
(58) Field of Search ........................ 318/568.1–568.23; 310/83; 901/9, 11–13, 20, 23–29

(56) References Cited

U.S. PATENT DOCUMENTS 4,678,952 A * 7/1987 Peterson et al. ............... 901/29
5,293,107 A * 3/1994 Akeel ....................... 318/568.11

FOREIGN PATENT DOCUMENTS

JP     A-8-184349     7/1996

* cited by examiner

Primary Examiner—Khanh Dang
(74) Attorney, Agent, or Firm—Akin, Gump, Strauss, Hauer & Feld, L.L.P.

(57) ABSTRACT

A speed reducer with rotation detector (100) is provided with a rotation detector (110) comprising a code plate (111) having the positional information corresponding to the rotation, a detecting portion (112) for detecting the positional information of the code plate (111) to transform the positional information to an electric signal for output, and an electronic device (113) having the function of processing the electric signal. The rotation detector (110) can detect the output rotation of a-first shaft (130) which is an output shaft at high resolving power and at high accuracy. Also, the speed reducer with rotation detector (100) is used with a motor (190) to enable the full-closed control of the motor (190) to be made at high resolving power and at high accuracy.

15 Claims, 10 Drawing Sheets

A – A

SPEED REDUCER WITH ROTATION DETECTOR

BACKGROUND OF THE INVENTION

The present invention relates to a speed reducer with rotation detector, and more particularly to a speed reducer with rotation detector for use with a motor, in which the data of output rotation can be fed back to the motor to drive correctly a joint of an industrial robot.

Conventionally, in a FA (Factory Automation) field, various speed reducers have been used for the precision control of industrial robots, machine tools, and dividing plates. These speed reducers may include, for example, a harmonic drive (Registered Trademark) speed reducer and other reducers. A speed reducer can be used with a motor to reduce the rotation of the motor, and drive an industrial robot. In this case, in order to drive a joint of the industrial robot correctly, a so-called semi-closed control method has been well-known in which the rotational information input from the motor to the speed reducer is detected, and the rotation of the motor is controlled on the basis of that information.

However, in such semi-closed control method, the output rotation of the speed reducer is predicted from the rotational information input from the motor to the speed reducer to control the rotation of the motor. However, in this semi-closed control method, there was some limit in the control precision of the rotation of the motor because it might be susceptible to a mechanical error of a speed reducing mechanism.

One method to resolve this problem, as disclosed in JP-A-8-184349, relied on a so-called full-closed control in which the rotational information output from an eccentric oscillating speed reducer is detected to control the rotation of the motor, based on its information. With this full-closed control method, the rotation of the motor can be controlled in accordance with the rotational information output from the eccentric oscillating speed reducer, viz., the rotational information in the neighborhood of a control object, resulting in less mechanical error of the speed reducing mechanism, and higher control accuracy than the method using the semi-closed control.

However, in the method as disclosed in JP-A-8-184349 as above cite, means for detecting the rotational information output from the eccentric oscillating speed reducer and outputting its information to the outside (hereinafter referred to as a rotation detector) was constituted of a code plate and a sensor. Hence, the rotation detector was restricted in resolving power by the code plate.

One technique to make better the resolving power of the rotation detector was the use of a multiplier for multiplying the frequency of the code plate by processing the information output from the rotation detector. The information output from the rotation detector is passed as an electric signal to the multiplier, its electric signal has a very low voltage level, and is susceptible to noise, resulting in lower precision of the rotation detector.

SUMMARY OF THE INVENTION

It is an object of the present invention to provide a speed reducer with rotation detector which can detect the output rotation at high resolving power and high precision, and make the full-closed control of a motor at high resolving power and high precision by using this speed reducer with rotation detector.

In order to solve the above problem, the present invention provides the following preferable arrangements:

(1) A speed reducer with rotation detector has an input shaft for inputting the rotation, a first shaft in co-axial relation with the input shaft, a second shaft in co-axial relation with the first shaft and forming a space with the first shaft to surround one end portion of the first shaft, bearings interposed between the first shaft and the second shaft to be in co-axial relation with each other, one being supported rotatably by the other, a speed reducing mechanism for reducing the rate of rotation input into the input shaft when one of the first shaft and the second shaft is fixed, to output it to the other of the first shaft and the second shaft, and a rotation detector for detecting the rotational information of one of the first shaft and the second shaft with respect to the other, interposed within the space formed between the first shaft and the second shaft. The rotation detector comprises a code plate having the positional information corresponding to the rotation, a detecting portion for detecting the positional information of the code plate to output an electrical signal into which the positional information is transformed, and an electronic device having amplifying means for amplifying a voltage of the electrical signal output from the detecting portion. Hence, an electric signal output from the detecting portion has a voltage level amplified by the electronic device in the neighborhood of the detecting portion, making it possible to reduce the influence of noise from the outside. Therefore, the rotational information of one of the first shaft and the second shaft with respect to the other can be captured accurately. Accordingly, if the speed reducer with rotation detector according to the invention is used with a motor, the rotational information output from the speed reducer with rotation detector can be detected. Thus, the rotation of the motor can be controlled at high precision, based on its information.

(2) A speed reducer with rotation detector according to (1), wherein in case where the second shaft is held stationary and the first shaft is used as an output shaft, the code plate is supported by the first shaft, and the detecting portion is supported by the second shaft. Thereby, the code plate has typically the positional information recorded on the external peripheral face.

(3) The present invention provides a speed reducer with rotation detector according to (1) or (2), wherein the electronic device comprises multiplying means for multiplying the frequency of an electric signal which the detecting portion outputs. Thereby, the resolving power of the rotation detector is not limited to the resolving power of the code plate, but can be better than the resolving power of the code plate. Hence, the rotational information of one of the first shaft and the second shaft with respect to the other can be captured at high resolving power. Accordingly, if the speed reducer with rotation detector according to the invention is used with a motor, the rotational information output from the speed reducer with rotation detector can be detected. Thus, the rotation of the motor can be controlled at high resolving power, based on its information.

(4) A speed reducer with rotation detector according to (1) or (2), wherein the rotation detector has a plurality of detecting portions, and the electric device has removing means for removing the influence of the code plate due to eccentricity from the electric signal which the plurality of the detecting portions output. The speed reducer with rotation detector has a problem that the first shaft or the second shaft may be eccentric. Therefore, there is some possibility that the detecting portions cannot detect the rotational information of one of the first shaft and the second shaft with respect to the other correctly. Even if the electric signal output from the detecting portions is improved in precision, the rotational information of one of the first shaft and the second shaft with respect to the other may be low in precision. Thus, by providing the plurality of detecting portions, it is possible to provide the rotational information in which influence of eccentricity is removed from the rotational information detected by the detecting portions.

(5) A speed reducer with rotation detector according to (1) or (2), wherein the electric device comprises signal retention means for retaining an electric signal which the detecting portion outputs. Thereby, in a case where the code plate is an increment type, the code plate can be artificially made an absolute type because the signal retention means retains the electric signal output from the detector.

(6) A speed reducer with rotation detector according to (1) or (2), further comprising a seal interposed between the first shaft and the second shaft, wherein the seal partitions the space formed between the first shaft and the second shaft to prevent the foreign matter from sticking to the rotation detector. Thereby, it is possible to prevent the iron powder or friction power mixed into the oil within the speed reducer with rotation detector from sticking to the rotation detector and avoid degradation in the precision and resolving power of the rotation detector.

(7) a speed reducer with rotation detector according to (2), wherein the code plate has an external peripheral face with the positional information, and a first shaft mounting face formed co-axially with the external peripheral face and having the first shaft mounted uniaxially, and the first shaft has a rolling face for rolling the bearings, and a code plate mounting face formed co-axially with the rolling face on which the code plate is mounted uniaxially. Thereby, the recording center of positional information and the rotational center of the speed reducer with rotation detector can be made coincident. Therefore, the speed reducer with rotation detector according to the present invention can detect the output rotation at high precision.

(8) A speed reducer with rotation detector, including: an input shaft for inputting the rotation; a first shaft in co-axial relation with said input shaft, said first shaft having an integral first bearing rolling surface and a code plate; a second shaft in co-axial relation with said first shaft and surrounding one end portion of said first shaft to form a space with said first shaft, said second shaft having an integral second bearing rolling surface; a bearing that held between the first and second bearing rolling surface; a speed reducing mechanism that transmits rotation of said input shaft to said second shaft when said first shaft is held stationary; and a rotation detector that is accommodated in said space formed between the first shaft and the second shaft, and that detects information on relative rotation between said first and second shafts in cooperation with said code plate. Since the bearing rolling surface and the code plate are both provided on the common first shaft, the rotation can be detected with high accuracy.

The present disclosure relates to the subject matter contained in Japanese patent application No. Hei. 11-208971 (filed on Jul. 23, 1999), which is expressly incorporated herein by reference in its entirety.

DESCRIPTION OF THE PREFERRED EMBODIMENT

The preferred embodiments of the present invention will be described below with reference to the drawings.

First Embodiment

Referring to FIGS. 1 to 5, an eccentric oscillating speed reducer with rotation detector according to the first embodiment of the present invention will be described below.

Figure 1:
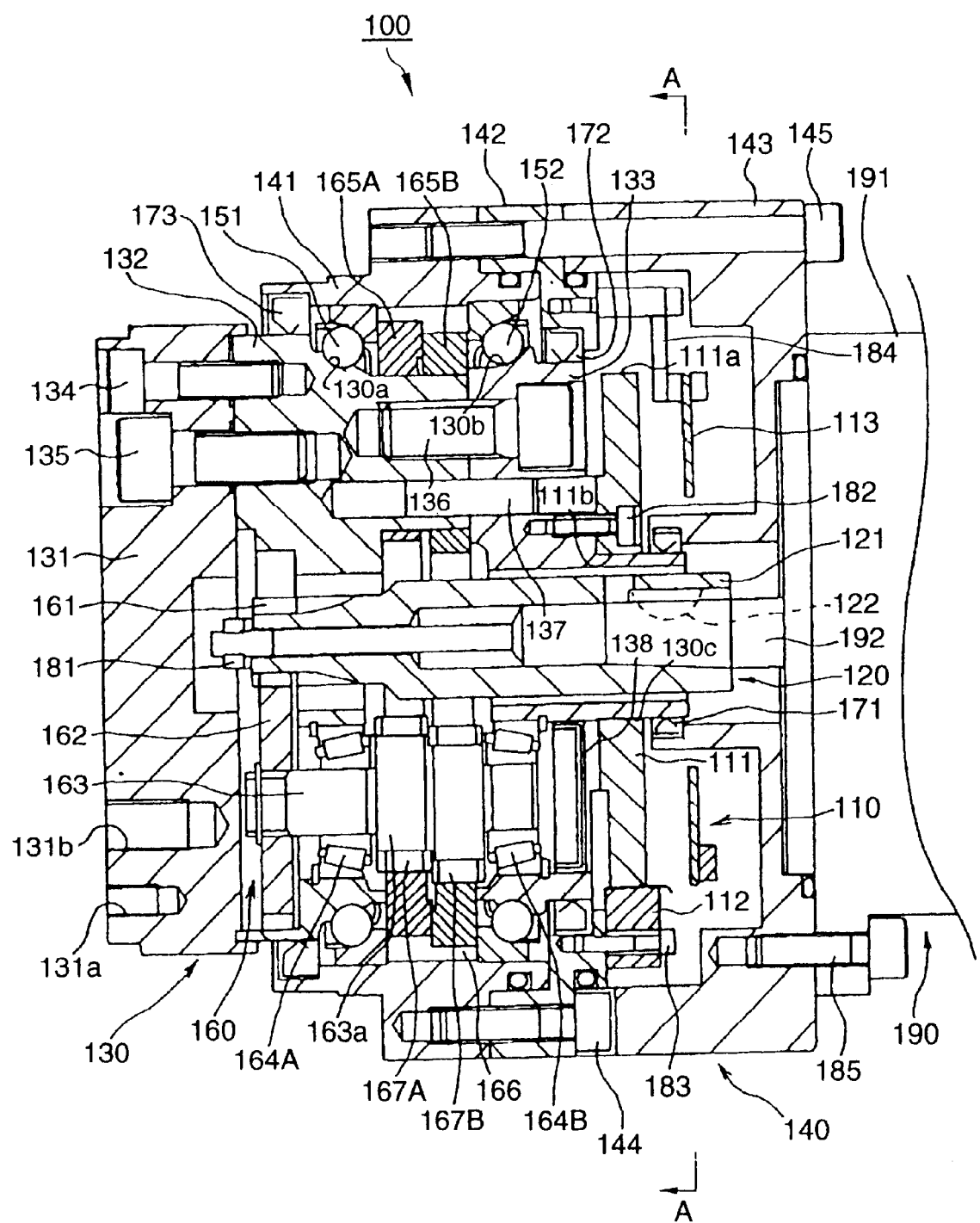
FIG. 1 is a side cross-sectional view of an eccentric oscillating speed reducer with rotation detector according to the first embodiment of the present invention.
Figure 2:
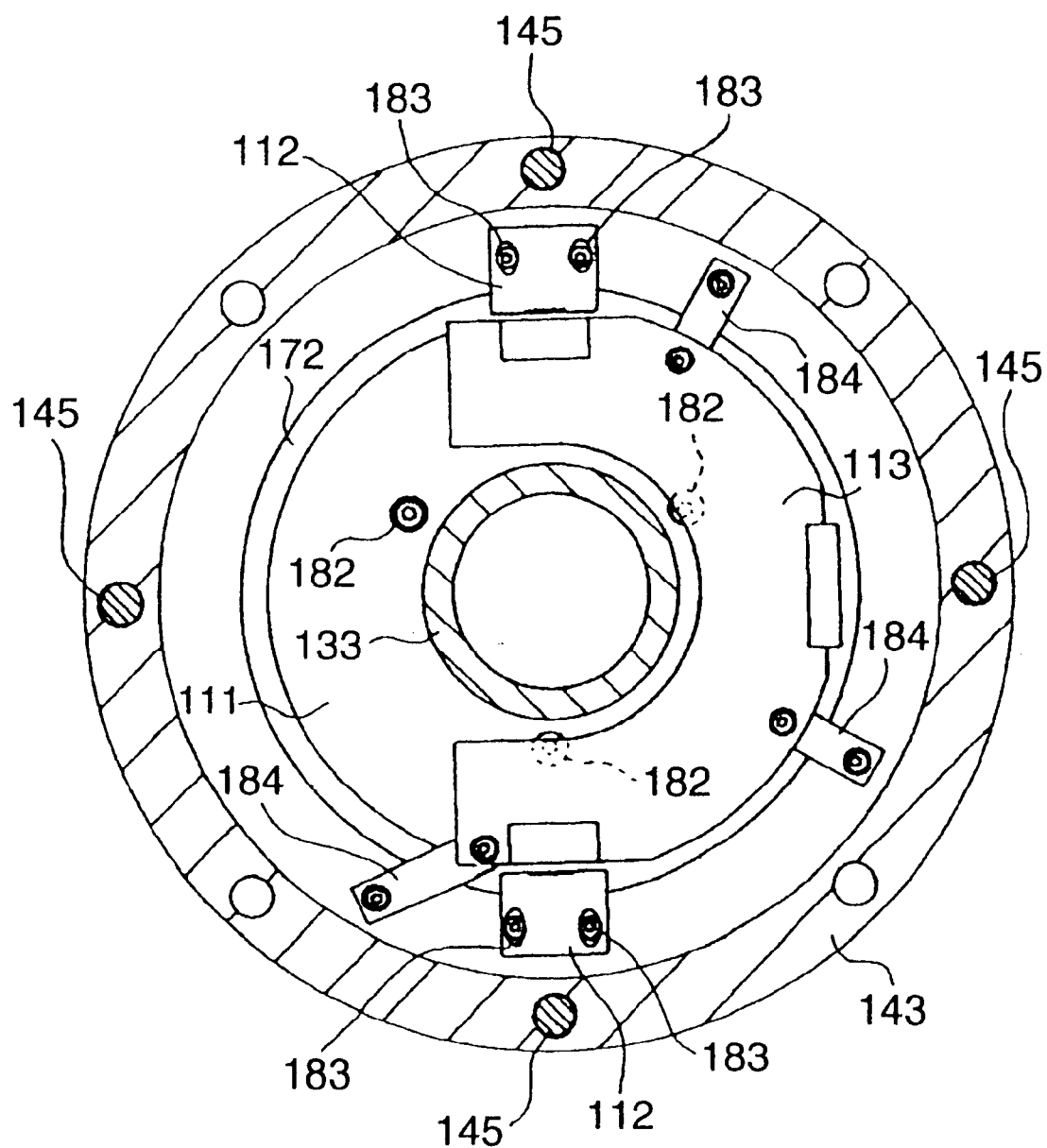
FIG. 2 is a cross-sectional view taken along the line A—A in FIG. 1.
Figure 3:
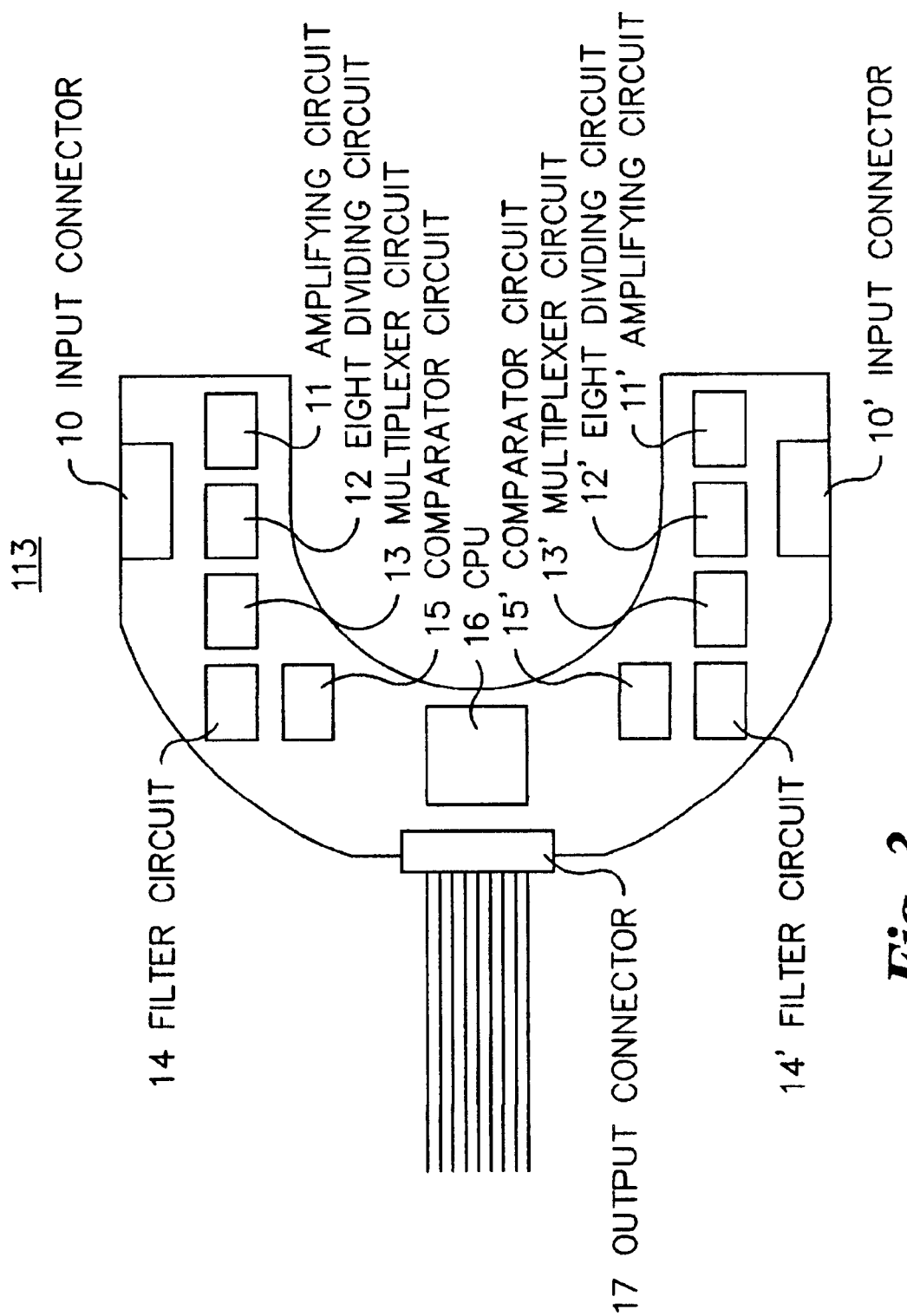
FIG. 3 is a plane view of an electronic device according to the first embodiment of the present invention.
Figure 4:
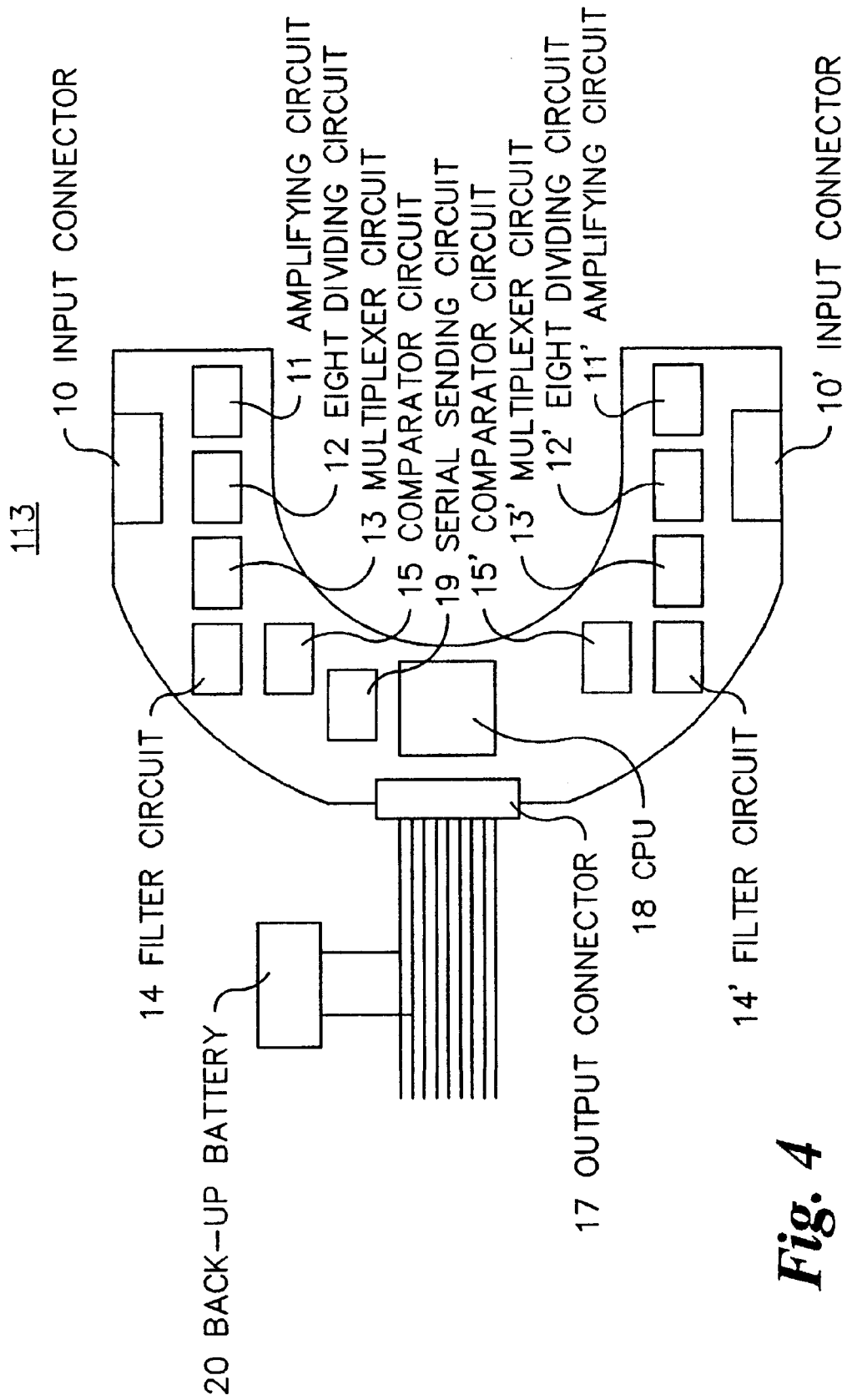
FIG. 4 is a plane view of another electronic device, like FIG. 3.
Figure 5:
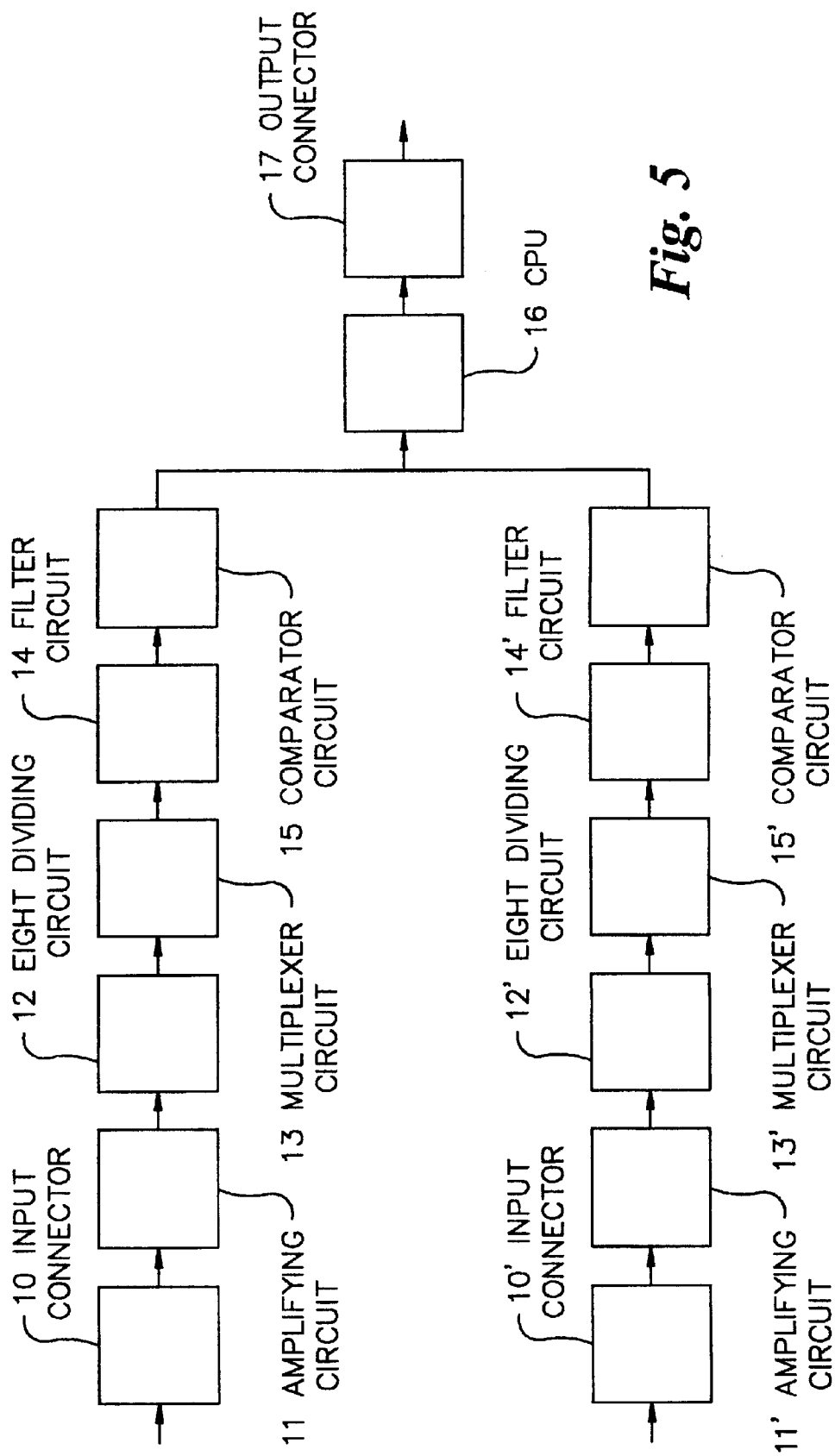
FIG. 5 is a block diagram of the electronic device as shown in FIG. 3.

FIGS. 1 and 2 show the eccentric oscillating speed reducer with rotation detector according to the first embodiment of the invention. FIG. 1 is a side cross-sectional view thereof, and FIG. 2 is a cross-sectional view taken along the line A—A of FIG. 1. Also, FIG. 3 is a plane view of an electronic device according to the-first embodiment of the invention. FIG. 4 is a plane view of another electronic device, like FIG. 3. FIG. 5 is a block diagram of the electronic device as shown in FIG. 3.

First, the configuration of this eccentric oscillating speed reducer will be described below.

In FIGS. 1 and 2, reference numeral 190 denotes a motor. This motor 190 is comprised of a motor main body 191 for producing the rotation and a rotational shaft 192 for transmitting the produced rotation to the outside.

Reference numeral 100 denotes the eccentric oscillating speed reducer with rotation detector, placed between the motor 190 and an external member (not shown), for reducing the rotation produced by the motor 190 to be output to the external member. The eccentric oscillating speed reducer with rotation detector 100 is comprised of an input shaft 120 for inputting the rotation, a first shaft 130 in co-axial relation with the input shaft 120 and disposed to surround the input shaft 120, a second shaft 140 in co-axial relation with the first shaft 130 and disposed to surround the first shaft 130, bearings 151 and 152 interposed between the first shaft 130 and the second shaft 140 to be in co-axial relation with each other, one being supported rotatably by the other, a speed reducing mechanism 160 for reducing the rate of rotation input into the input shaft 120 when one of the first shaft and the second shaft is fixed, to output it to the other of the first shaft 130 and the second shaft 140, and a rotation detector 110 for detecting the rotational information of one of the first shaft 130 and the second shaft 140 with respect to the other, interposed between the first shaft 130 and the second shaft 140.

Each component of the eccentric oscillating speed reducer with rotation detector 100 will be described below in detail.

The rotation detector 110 is of cylindrical shape, and comprises a code plate 111 of increment type having the positional information recorded on an external peripheral face 111a due to magnetism, a detecting portion 112 for detecting the positional information of the code plate 111 to transform its positional information into an electric signal for output, and an electronic device 113 for processing the electric signal passed from the detecting portion 112. The code plate 111 is made up of a non-magnetic material, such as aluminum, and magnetic material that is coated or applied onto the outer periphery of the non-magnetic material and that has the positional information recorded thereon. Accordingly, the magnetic material on which the positional information is recorded is prevented from being directly contacted with the first shaft 130.

The input shaft 120 is comprised of an input shaft main body 121 and a key 122 attached inside the input shaft main body 121. This input shaft 120 inputs the rotation of the motor 190 to the eccentric oscillating speed reducer with rotation detector 100. At the top end portion of the input shaft main body 121, a first spur gear 161 having a predetermined number of teeth is provided. A rotational shaft 192 of the motor is secured to the input shaft main body 121 by means of the key 122. The input shaft main body 121 is screwed with the top end of the rotational shaft 192 by a nut 181. The input shaft 120 is secured to the rotational shaft 192.

The first shaft 130 is comprised of an output plate 131, secured to the external member, for outputting the rotation to the external member, the rate of rotation being reduced by the eccentric oscillating speed reducer with rotation detector 100, a first shaft first main body 132 fixed to the output plate 131 by a plurality of bolts 134, 135 disposed at a predefined interval circumferentially, a first shaft second main body 133 fixed to the first shaft first main body 132 by a plurality of bolts 136 disposed at a predefined interval circumferentially, the first shaft second main body 133 being positioned by a plurality of locator pins 137 disposed at a predefined interval circumferentially, and a partition lid 138 for partitioning to keep the oil within the eccentric oscillating speed reducer with rotation detector 100 from flowing into the rotation detector 110. This first shaft 130 conveys the rotation input from the input shaft 120 and reduced in rate by the eccentric oscillating speed reducer with rotation detector 100 to the external member. Herein, the output shaft 131 has a plurality of bolt mounting portions 131a, 131b formed at a predefined interval circumferentially on one face. The plurality of bolt mounting portions 131a, 131b fix the external member.

The second shaft 140 is annular, and comprises an internal gear member 141 having an internal gear 166 provided by a pin around an inner periphery thereof, a detecting portion mounting member 142 for mounting a detecting portion 112, secured to the internal gear member 141 by a plurality of bolts 144, 145 disposed at a predefined interval circumferentially, and a motor mounting member 143 for mounting the motor 190, secured to the detecting portion mounting member 142 by a plurality of bolts 145 disposed at a defined interval circumferentially. The detecting portion 112 is mounted on the detecting portion mounting member 142 by a bolt 183 to be a certain distance away from the external peripheral face 111a of the code plate 111. The code plate 111 is secured onto the first shaft second main body 133 to be rotatable along with the first shaft second main body 133. In addition to the detecting portion 112, an electronic device 113 is mounted on the detecting portion mounting member 142 by an electronic device mounting member 184. A motor main body 191 of the motor 190 is mounted to a motor mounting member 143 by a plurality of bolts 185 disposed at a predefined interval circumferentially.

A bearing 151 is interposed between the first shaft first main body 132 and the internal gear member 141, and a bearing 152 is interposed between the first shaft second main body 133 and the internal gear member 141. By these bearings 151, 152, the first shaft 130 is supported rotatably by the second shaft 140.

A speed reducing mechanism 160 is comprised of a first spur gear 161, a plurality of second spur gears 162 provided at a predefined interval circumferentially to surround and mate with the first spur gear 161 and having a greater number of teeth than the first spur gear 16, a plurality of crankshafts 163 having a pair of crank portions 163a, and having the second spur gears 162 mounted at the top end to be in co-axial relation, bearings 167A, 167B, 164A and 164B, an internal gear 166, and a pair of external gears 165A and 165B disposed to mate with the internal gear 166 and having slightly less number of teeth than that of the internal gear 166 on the external periphery. This speed reducing mechanism 160 reduces the speed of rotation input into the eccentric oscillating speed reducer with rotation detector 100. One end portion of the plurality of crankshafts 163 is supported via the bearing 164A by the first shaft first main body 132, and the other end portion of the plurality of crankshafts 163 is supported via the bearing 164B by the first shaft second main body 133. By the bearings 164A, 164B, the plurality of crankshafts 163 are supported rotatably by the first shaft 130. The external gears 165A, 165B are supported via the bearings 167A, 167B by a pair of crank portions 163a for each of the plurality of crankshafts 163. Thereby it is possible to effect a circular motion with a predetermined amount of eccentricity with respect to a central axis of the internal gear member 141, viz., a revolutional motion with a radius of revolution equal to the predetermined amount of eccentricity, along with the rotation of the crankshafts 163.

Reference numerals 171, 172 and 173 denote a seal for restricting the flow of oil within the eccentric oscillating speed reducer with rotation detector 100. A seal 171 is placed between the first shaft second main body 133 and the motor mounting member 143, a seal 172 placed between the first shaft second main body 133 and the detecting portion mounting member 142, and a seal 173 placed between the first shaft first main body 132 and the internal gear member 141. That is, each of the seals 171, 172 and 173 is interposed between two members that are located between the first shaft 130 and the second shaft 140 and that are rotated at a relatively low speed.

The components of the electronic device 113 will be described below in detail.

In FIGS. 3 to 5, reference numerals 10, 10' denote an input connector for inputting an output electric signal from the detecting portion 112 into the electronic device 113. Reference numerals 11, 11' denote an amplifier circuit for amplifying the voltage of electric signal. Reference numerals 12, 12' denote an eight dividing circuit for generating eight approximate sinusoidal electric signals which are phase shifted by 45 degrees in sequence, based on electric signals of approximate sinusoidal wave in A phase and B phase having a phase difference of 90 degrees from each other. Reference numerals 13, 13' denote a multiplexer circuit for producing in time series eight approximate sinusoidal electric signals generated by the eight dividing circuit 12, 12'.

Reference numeral 14, 14' denote a filter circuit for removing the unwanted frequency component from the electric signal. Reference numerals 15, 15' denote a comparator circuit for digitizing the electric signal. Reference numeral 16 denotes a CPU for processing the digitized electric signal. Reference numeral 18 denotes a CPU containing a memory for processing the digitized electric signal. Reference numeral 17 denotes an output connector for outputting the electric signal processed by the electronic device 113 to the outside. Reference numeral 19 denotes a serial transmission circuit for serially transmitting the signal. Reference numeral 20 denotes a back-up battery for preserving the information. Herein, the amplifier circuits 11, 11' constitute amplifying means. Also, the eight dividing circuits 12, 12', the multiplexer circuits 14, 14', the filter circuits 14, 14', the comparator circuits 15, 15', and the CPUs 16, 18 constitute multiplying means for multiplying the frequency of an electric signal passed from the detecting portion 112. Also, the amplifier circuits 11, 11', the eight dividing circuits 12, 12', the multiplexer circuits 13, 13', the filter circuits 14, 14', the comparator circuits 15, 15' and the CPUs 16, 18 constitute removing means for removing the influence of the code plate 111 due to eccentricity from the electric signal passed from a plurality of detecting portions 112. The CPU 18 and the back-up battery 20 constitute signal retention means for retaining the electric signal passed from the detecting portion 112.

The action of this eccentric oscillating speed reducer with rotation detector will be described below.

Firstly, the rotation input from the motor 190 is reduced by the eccentric oscillating speed reducer with rotation detector 100 and output to the external member.

In FIG. 1, the rotation is generated by the motor main body 191 of the motor 190. Since the rotational shaft 192 and the input shaft 120 are linked, its rotation is input via the input shaft 120 into the eccentric oscillating speed reducer with rotation detector 100. The rotation input via the input shaft 120 is conveyed from the first spur gear 161 having a predefined number of teeth which is formed at the top end portion of the input shaft main body 121 to the speed reducing mechanism 160.

Since the second spur gear 162 has a greater number of teeth than the first spur gear 161, the rotation conveyed to the speed reducing mechanism 160 is reduced at a predetermined reduction ratio corresponding to the ratio of the number of teeth of the first spur gear 161 to that of the second spur gear 162, and then conveyed to the plurality of crankshafts 163. Then, since the external gears 165A, 165B have a slightly smaller number of teeth than the internal gear 166, the rotation conveyed to the plurality of crankshafts 163 is further reduced at a predetermined reduction ratio corresponding to a difference in the number of teeth between the internal gear 166 and the external gears 165A, 165B.

Because the second shaft 140 is fixed with motor 190 by means of the bolt 185, and the first shaft 130 is supported rotatably by the second shaft 140 via the bearings 151, 152, the rotation reduced by the speed reducing mechanism 160 can be conveyed to the first shaft 130.

Lastly, the rotation conveyed to the first shaft 130 is output to the external member secured to the output plate 131.

In the above way, the rotation input from the motor 190 is reduced by the eccentric oscillating speed reducer with rotation detector 100 and output to the external member.

The action of the characteristic parts of the present invention will be described below.

In FIG. 1, the code plate 111 is attached at the first shaft 130, and the detecting portion 112 is attached at the second shaft 140. Hence, when the first shaft 130 is rotated with respect to the second shaft 140, the code plate 111 is also rotated with respect to the detecting portion 112. Since the code plate 111 has the positional information recorded on the external peripheral face 111a due to magnetism, the positional information of the code plate 111 detected by the detecting portion 112 becomes the rotational information of the code plate 111, viz., the rotational information of the first shaft 130. Since the eccentric oscillating speed reducer with rotation detector 100 has two detecting portions 112 (see FIG. 2), it is possible to correct for an error caused by dislocation between the central axis of the code plate 111 and the rotation axis of the first shaft 130 which may occur in mounting the code plate 111, and a mechanical error of the eccentric oscillating speed reducer with rotation detector 100. Note that three or more detecting portions 112 may be provided. Though a single detecting portion 112 maybe provided naturally, it is more susceptible to the mechanical error than when two or more detecting portions are provided.

The positional information of the code plate 111 detected by the detecting portion 112 is transformed into an electric signal by the detecting portion 112 to be output to the electronic device 113. The electric signal output to the electronic-device 113 has the voltage amplified by the electronic device 113, has the frequency multiplied and is output to the motor 190 via a wiring, not shown. The motor 190 receives this electronic signal and determines the rotation for output to the rotational shaft 192. In this way, the electronic device 113 enables the output rotation to be detected at high resolving power and high precision. The function of the electronic device 113 will be described later.

When the first shaft 130 is rotated with respect to the second shaft 140, the seals 171, 172 prevent the oil within the eccentric oscillating speed reducer with rotation detector 100 from flowing into a space surrounded by the first shaft second main body 133, the detecting portion mounting member 142, the motor mounting member 143 and the partition lid 138, where the rotation detector 110 is disposed. Accordingly, the iron powder or friction powder mixed into the oil does not stick to the rotation detector 110, leading to higher precision of the position detection. Since the electronic device 113 is placed within the eccentric oscillating speed reducer with rotation detector 100, the eccentric oscillating speed reducer with rotation detector 100 can be made smaller. The electronic device 113 is installed near the detecting portion 112, the electric signal output from the detecting portion 112 can be less liable to the external noise and the waveform distortion in the transmission path.

Since portions for attaching the bearings 151, 152 for the first shaft 130, i.e. rolling surfaces 130a and 130b, and a portion for mounting the code plate 111, i.e. a code plate mounting surface 130c, are formed in co-axial relation, they can be polished at the same time while being rotated about the common axis. Also, since the inner peripheral face 111b and the outer peripheral face 111a of the code plate 111 are formed in co-axial relation, they can be polished at the same time while being rotated about the common axis. Accordingly, when the first shaft 130 and the code plate 111 are assembled, the central axis of the code plate and the rotation axis of the first shaft 130 can be made coincident.

Referring now to FIG. 1 and FIGS. 3 to 5, the function of the electronic device 113 will be described below.

First, the electronic device according to the first embodiment of the invention as shown in FIG. 3 will be described below.

In FIGS. 3 and 5, an electric signal of approximate sinusoidal wave in A phase and B phase having a phase difference of 90 degrees with each other is input from one detecting portion 112 into the input connector 10. Then, the input electric signal of approximate sinusoidal wave in A phase and B phase has the voltage amplified by the amplifying circuit 11. Accordingly, the electric signal of approximate sinusoidal wave is less susceptible to the external noise. On the basis of the electric signal of approximate sinusoidal wave in A phase and B phase having the voltage amplified, the eight dividing circuit 12 produces eight sinusoidal electric signals which are phase shifted by 45 degrees in succession through the inversion amplifier. Then, the multiplexer circuit 13 selects and outputs eight sinusoidal electric signals produced successively in time series. The output electric signal has the unwanted frequency component removed by the filter circuit 14, and digitized by the comparator circuit 15. At this time, a clock signal is sent from the CPU 16 to the multiplexer circuit 13. Hence, if the code plate 111 is rotated by one pitch with respect to the detecting portion 112, the electric signal digitized by the comparator circuit 15 gives rise to a phase difference of $2\pi$ relative to a reference signal in the CPU 16. Therefore, by measuring this phase difference, the frequency of the code plate 111 can be multiplied. An electric signal from the other detecting portion 112 is also handled through the input connector 10', the amplifier circuit 11', the eight dividing circuit 12', the multiplexer circuit 13', the filter circuit 14' and the comparator circuit 15' in the same way as the electric signal from the one detecting portion 112. And with these electric signals from two detecting portions 112, it is possible to correct for an error caused by dislocation between the axis of the code plate 111 and the rotation axis of the first shaft 130 which may occur in mounting the code plate 111 and a mechanical error of the eccentric oscillating speed reducer with rotation detector 100. Also, the output wirings of this electronic device 113 involve a total of six wires for the signals of A phase, B phase and reference signal Z phase and their opposite signals and three wires for the power source, resulting in a total of nine wires.

Note that the opposite signals of A phase, B phase and reference signal Z phase are used to reduce the noise in signal transmission.

The electronic device according to the first embodiment of the invention as shown in FIG. 4 will be described below.

Referring to FIG. 4, this electronic device 113 has fundamentally the same action as the electronic device 113 as shown in FIG. 3, except that the CPU 18 retains an electric signal from the detecting portion 112 which is processed through a predetermined program to have an absolute value in an internal memory of the CPU 18 with the back-up battery 20. Then, the CPU 18 and the back-up battery 20 constitute signal retention means. This electric signal of absolute value is transmitted as serial data by a serial sending circuit 19. This signal retention means enables the positional information detected by the detecting portion 112 to be stored in the internal memory of the CPU 18. Therefore, this electronic device 113 enables the code plate 111 of increment type to be used with the rotation detector 110 of absolute type. Accordingly, the use of this electronic device 113 can eliminate the need of return-to-zero operation of the code plate 111. The output wirings of this electronic device 113 involve the signal lines for the signal of serial data and its opposite signal and three power source lines, namely, a total of five lines.

The opposite signal with respect to the electric signal of serial data is used to reduce the noise in signal transmission.

Note that using the electronic device 113 of absolute type can reduce the number of output wires.

Second Embodiment

An eccentric oscillating speed reducer according to the second embodiment of the present invention will be described below with reference to FIGS. 6 and 7.

Figure 6:
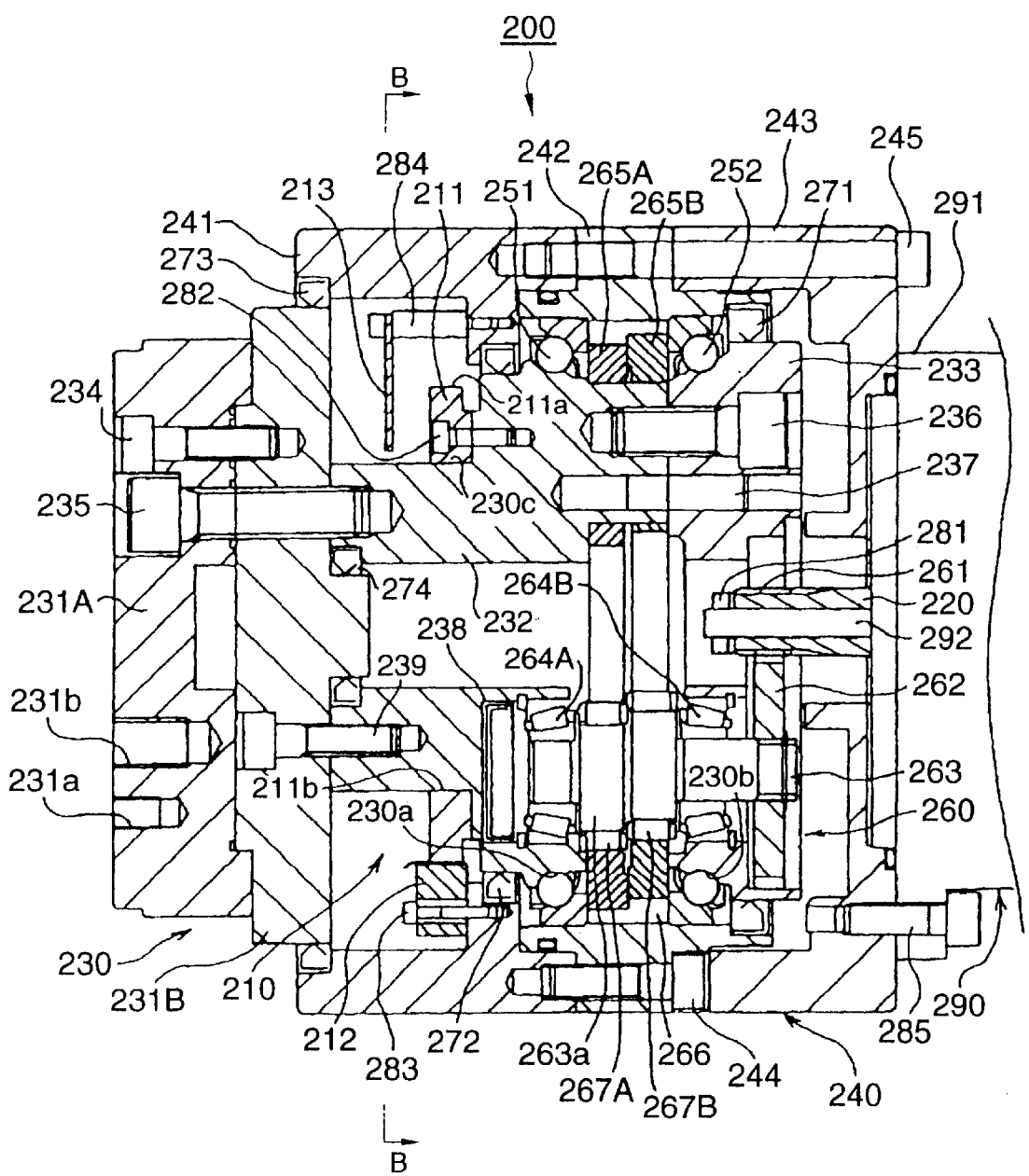
FIG. 6 is a side cross-sectional view of an eccentric oscillating speed reducer with rotation detector according to the second embodiment of the present invention.
Figure 7:
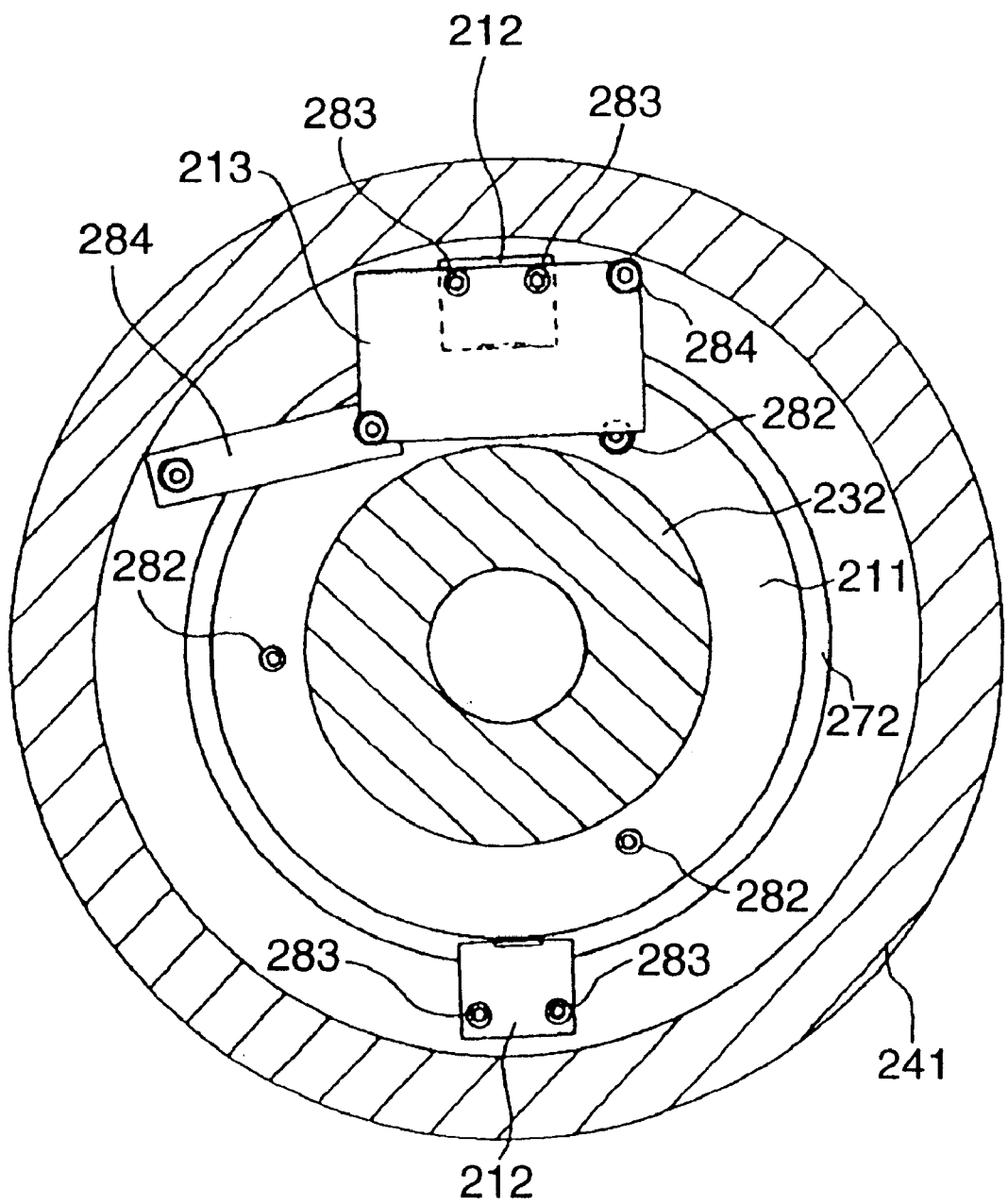
FIG. 7 is a cross-sectional view taken along the line B—B in FIG. 6.

FIGS. 6 and 7 are views showing the eccentric oscillating speed reducer with rotation detector according to the second embodiment of the present invention. FIG. 6 is a cross-sectional view thereof, and FIG. 7 is a cross-sectional view taken along the line B—B in FIG. 6.

Firstly, the configuration of the eccentric oscillating speed reducer with rotation detector will be described below.

In FIGS. 6 and 7, reference numeral 290 denotes a motor, which is comprised of a motor main body 291 for producing the rotation and a rotation shaft 292 for outputting the produced rotation to the outside.

Reference numeral 200 denotes the eccentric oscillating speed reducer with rotation detector, located between the motor 290 and an external member (not shown), for reducing the rotation produced by the motor 290 to be output to the external member. The eccentric oscillating speed reducer with rotation detector 200 is comprised of an input shaft 220 for inputting the rotation, a first shaft 230 in co-axial relation with the input shaft 220 and disposed to surround the input shaft 220, a second shaft 240 in co-axial relation with the first shaft 230 and disposed to surround the first shaft 230, bearings 251 and 252 interposed between the first shaft 230 and the second shaft 240 to be in co-axial relation with each other, one being supported rotatably by the other, a speed reducing mechanism 260 for reducing the rate of rotation input into the input shaft 220 when one of the first shaft 230 and the second shaft 240 is fixed, to output it to the other of the first shaft 230 and the second shaft 240, and a rotation detector 210 for detecting the rotational information of one of the first shaft 230 and the second shaft 240 with respect to the other, interposed between the first shaft 230 and the second shaft 240.

Each component of the eccentric oscillating speed reducer with rotation detector 200 will be described below in detail.

The rotation detector 210 is of cylindrical shape, and comprises a code plate 211 of increment type having the positional information recorded on an external peripheral face 211a due to magnetism, a detecting portion 212 for detecting the positional information of the code plate 211 to transform its positional information into an electric signal for output, and an electronic device 213 for processing the electric signal passed from the detecting portion 212. The code plate 211 is made up of non-magnetic material, such as aluminum, and magnetic material that is coated or applied on the outer periphery of the non-magnetic material and that has the positional information recorded thereon. Accordingly, the magnetic material on which the positional information is recorded is prevented from being directly contacted with the first shaft 230.

The input shaft 220 inputs the rotation of the motor 190 into the eccentric oscillating speed reducer with rotation detector 200. The input shaft 220 is screwed with the top end of the rotational shaft 292 by a nut 281, and is secured to the rotational shaft 292.

The first shaft 230 is comprised of a first output plate 231A, secured to the external member, for outputting the rotation to the external member, the rate of rotation being reduced by the eccentric oscillating speed reducer with rotation detector 200, a second output plate 231B secured to the first output plate 231A by a plurality of bolts 234, 235 disposed at a predefined interval circumferentially, a first shaft first main body 232 fixed to the second output plate 231B by a plurality of bolts 235, 239 disposed at a predefined interval circumferentially, a first shaft second main body 233 fixed to the first shaft first main body 232 by a plurality of bolts 236 disposed at a predefined interval circumferentially, the first shaft second main body 233 being positioned with respect to the first shaft first main body 232 by a plurality of locator pins 237 disposed at a predefined interval circumferentially, and a partition lid 238 for partitioning to keep the oil within the eccentric oscillating speed reducer with rotation detector 200 from flowing into the rotation detector 210. This first shaft 230 conveys the rotation input from the input shaft 220 and reduced in rate by the eccentric oscillating speed reducer with rotation detector 200. Herein, the first output shaft 231A has a plurality of bolt mounting portions 231a, 231b formed at a predefined interval circumferentially on the opposite face. The plurality of bolt mounting portions 231a, 231b fix. the external member. The code plate 211 is attached to the first shaft first main body 232 by a bolt 282. The second shaft 240 is comprised of a detecting portion mounting member 241 for mounting a detecting portion 212, an annular internal gear member 242 having an internal gear 266 provided by a pin on an inner periphery thereof, the internal gear member 242 being secured to the detecting portion mounting member 241 by a plurality of bolts 244, 245 disposed at a predefined interval circumferentially, and a motor mounting member 243 for mounting a motor 290, secured to the internal gear member 242 by a plurality of bolts 245 disposed at a defined interval circumferentially. The detecting portion 212 is mounted on the detecting portion mounting member 242 by a bolt 283 to keep a certain distance away from the external peripheral face 211a of the code plate 211. The code plate 211 is secured onto the first shaft first main body 232 to be rotatable along with the first shaft first main body 233. In addition to the detecting portion 212, an electronic device 213 is mounted on the detecting portion mounting member 241 by an electronic device mounting member 284. The motor main body 291 of the motor 290 is mounted to the motor mounting member 243 by a plurality of bolts 285 disposed at a predefined interval circumferentially.

A bearing 251 is interposed between the first shaft first main body 232 and the internal gear member 241, and a bearing 252 is interposed between the first shaft second main body 233 and the internal gear member 241. By these bearings 251, 252, the first shaft 230 is supported rotatably by the second shaft 240.

A speed reducing mechanism 260 is comprised of a first spur gear 261, a plurality of second spur gears 262 provided at a predefined interval circumferentially to surround and mate with the first spur gear 261 and having a greater number of teeth than the first spur gear 261, a plurality of crankshafts 263 having a pair of crank portions 163a, with the second spur gears 262 mounted at the top end thereof to be in co-axial relation, bearings 267A, 267B, 264A and 264B, an internal gear 266, and a pair of external gears 265A and 265B disposed to mate with the internal gear 266 and having a slightly smaller number of teeth than the internal gear 266 on the external periphery. This speed reducing mechanism 260 reduces the speed of rotation input into the eccentric oscillating speed reducer with rotation detector 200. One end portion of the plurality of crankshafts 263 is supported via a bearing 264A by the first shaft first main body 232, and the other end portion of the plurality of crankshafts 263 is supported via a bearing 264B by the first shaft second main body 233. By the bearings 264A, 264B, the plurality of crankshafts 263 are supported rotatably by the first shaft 230. The external gears 265A, 265B are supported via the bearings 267A, 267B by a pair of crank portions 263a for each of the plurality of crankshafts 263, respectively. Thereby it is possible to effect a circular motion with a predetermined amount of eccentricity with respect to a central axis of the internal gear member 241, viz., a revolutional motion with a radius of revolution equal to the predetermined amount of eccentricity, along with the rotation of the crankshafts 263.

Reference numerals 271, 272, 273 and 274 denote a seal for restricting the flow of oil within the eccentric oscillating speed reducer with rotation detector 200. A seal 271 is placed between the first shaft second main body 233 and the internal gear member 242, a seal 272 placed between the first shaft first main body 233 and the internal gear member 242, a seal 273 placed between the detecting portion mounting member 241 and the second output plate 231, and a seal 274 placed between the first shaft first main body 232 and the second output plate 231B. That is, each of the seals 271, 272 and 273 are interposed between two members that are located between the first shaft 230 and the second-shaft 240 and that are rotated at a relatively low speed.

The action of this eccentric oscillating speed reducer with rotation detector 200 will be described below.

Firstly, the rotation input from the motor 290 is reduced by the eccentric oscillating speed reducer with rotation detector 200 and output to the external member in the same way as in the first embodiment.

The action of the characteristic parts of the present invention will be described below.

In FIG. 1, the code plate 211 is attached at the first shaft 230, and the detecting portion 212 is attached at the second shaft 240. Hence, when the first shaft 230 is rotated with respect to the second shaft 240, the code plate 211 is rotated with respect to the detecting portion 212. Since the external peripheral face 211a of the code plate 211 has the positional information recorded due to magnetism, the positional information of the code plate 211 detected by the detecting portion 212 becomes the rotational information of the code plate 211, viz., the rotational information of the first shaft 230. Since the eccentric oscillating speed reducer with rotation detector 200 has two detecting portions 212 (see FIG. 7), it is possible to correct for an error caused by dislocation between the axis of the code plate 211 and the rotation axis of the first shaft 230 which may occur in mounting the code plate 211, and a mechanical error of the eccentric oscillating speed reducer with rotation detector 200.

The positional information of the code plate 211 detected by the detecting portion 212 is transformed into an electric signal by the detecting portion 212 to be output to the electronic device 213. The electric signal output to the electronic device 213 has the voltage amplified by the electronic device 213, the frequency multiplied and is output to the motor 290 via a wiring, not shown. The motor 290 receives this electronic signal and determines the rotation for output to the rotational shaft 292. In this way, the electronic device 213 enables the output rotation to be detected at high resolving power and high precision.

The function of the electronic device 213 is the same as that of the electronic device 113 of the first embodiment.

When the first shaft 230 is rotated with respect to the second shaft 240, the seals 271, 272 prevent the oil within the eccentric oscillating speed reducer with rotation detector 200 from flowing into a space surrounded by the first shaft first main body 232, the second output plate 231B, the detecting portion mounting member 241, and the partition lid 238, where the rotation detector 210 is disposed. Accordingly, the iron powder or friction powder mixed into the oil does not stick to the rotation detector 210, enabling the higher precision position detection to be made. Since the electronic device 213 is placed within the eccentric. oscillating speed reducer with rotation detector 200, the eccentric oscillating speed reducer with rotation detector 200 can be made smaller. The electronic device 213 is installed near. the detecting portion 212, the electric signal output from the detecting portion 212 can be less liable to the external noise and the waveform distortion in the transmission path.

Since portions for attaching the bearings 251, 252 for the first shaft 230, i.e. rolling surfaces 230a and 230b, and a portion for mounting the code plate 211, i.e. a code plate mounting surface 230c are formed in co-axial relation, they can be polished at the same time while being rotated about the common axis. Also, since the inner peripheral face 211b and the outer peripheral face 211a of the code plate 211 are formed in co-axial relation, they can be polished at the same time while being rotated about the common axis. Accordingly, when the first shaft 230 and the code plate 211 are assembled, the central axis of the code plate 211 and the rotation axis of the first shaft 230 can be made coincident.

Figure 8:
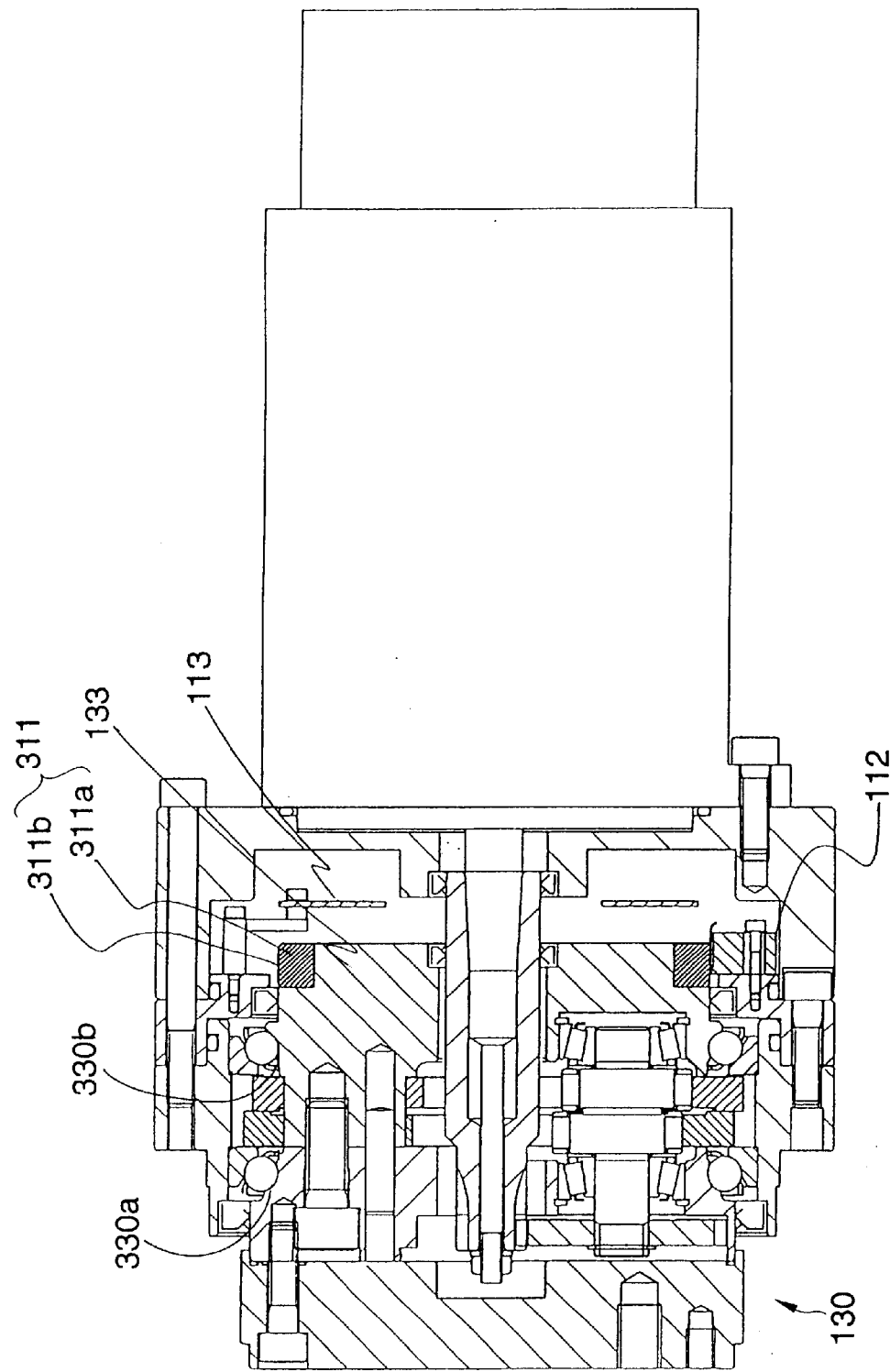
FIG. 8 is a side cross-sectional view of an eccentric oscillating speed reducer with rotation detector according to the third embodiment of the present invention.

The code plate may be provided on the first shaft in the following manner: That is, as shown in FIG. 8 which illustrates a modification of the first embodiment, a non-magnetic member (for example, an aluminum foil or aluminum member) 311a in the form of a ring is pressure-fitted onto or pressure-inserted into the first shaft 130 (e.g. the first shaft second main body 133), and magnetic material 311b is coated or applied onto the outer circumferential surface of the non-magnetic member 311a. Then, the rolling surfaces 330a and 330b for the bearings on the first shaft 130, and the magnetic material 311b thus coated or applied on the non-magnetic member 311a are polished simultaneously while rotating the first shaft 130. Thereafter, the positional information is recorded onto the magnetic material 311b thus polished. In this manner, the code plate 311 on the first shaft 130 can be provided. The use of the aluminum foil or aluminum member contributes to the reduction of weight and cost. In addition, without the use of the non-magnetic ring 311a, the non-magnetic material may be directly coated or applied onto the first shaft 130, or may be mixed into the first shaft 130 when the first shaft 130 is molded or casted so that the magnetic material 311b is prevented from being directly contacted with the first shaft 130 by the non-magnetic material.

In this modification, the rolling surfaces 330a and 330b and the outer peripheral face of the code plate 311 are formed to have co-axial relation similarly to the first embodiment.

Figure 9:
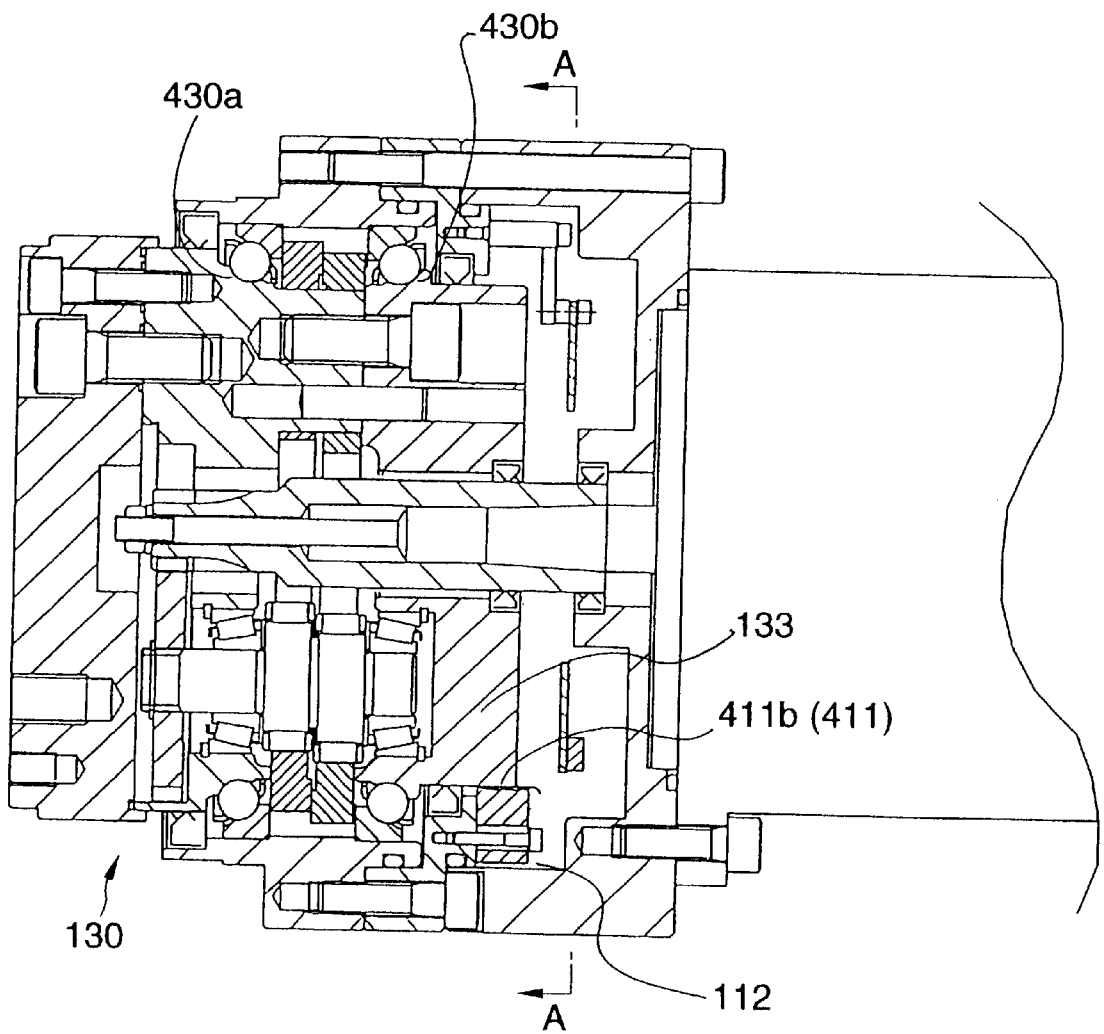
FIG. 9 is a side cross-sectional view of an eccentric oscillating speed reducer with rotation detector according to the fourth embodiment of the present invention.
Figure 10:
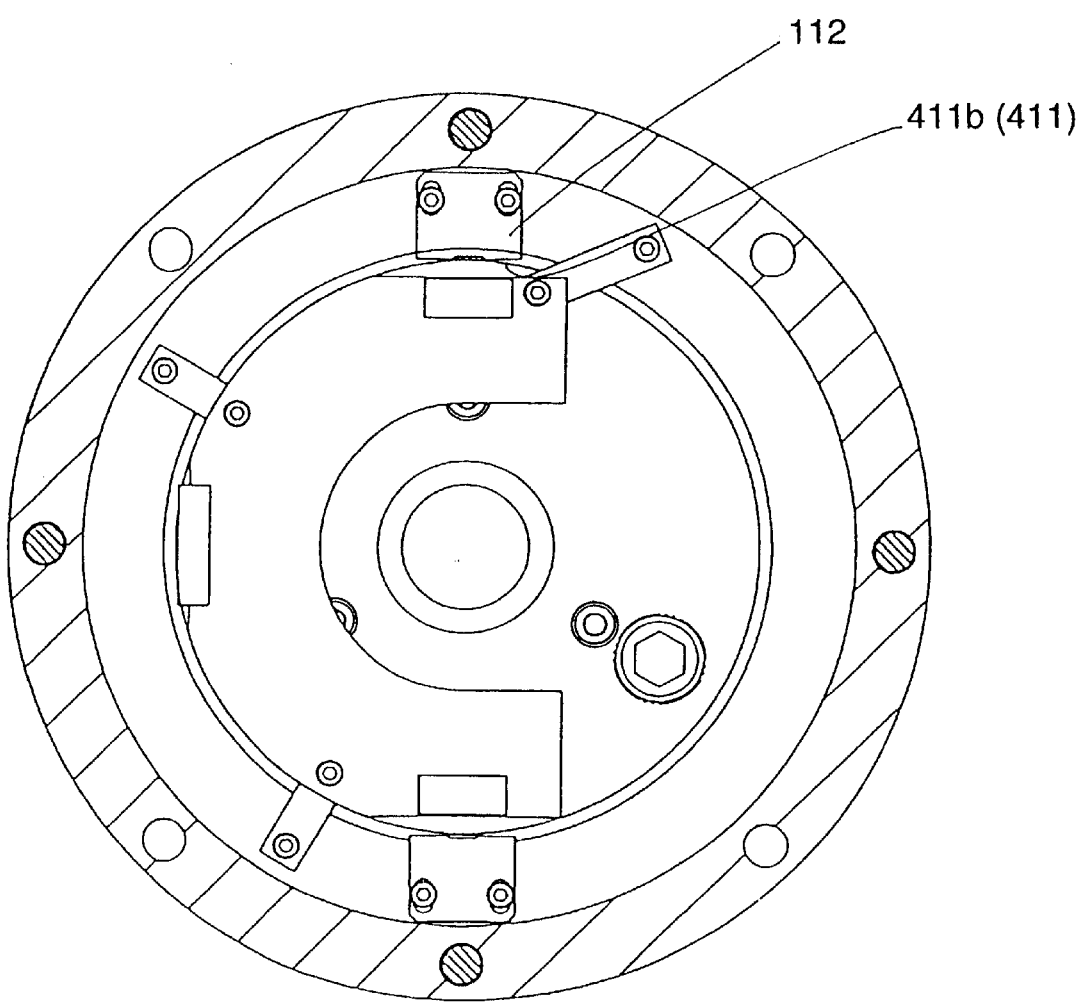
FIG. 10 is a cross-sectional view taken along the line A—A of FIG. 9.

Moreover, to form the code plate on the first shaft, the magnetic material may be coated or applied directly onto the outer circumferential surface of the first shaft at its one end. FIGS. 9 and 10 show such an embodiment (another modification of the first embodiment). In the illustrated embodiment, the magnetic material 411b is coated or applied directly onto the outer circumferential surface of the first shaft 130 (e.g. the first shaft second main body 133) at its one end. In this embodiment, the first shaft second main body 133 is made of non-magnetic material. The magnetic material 411b thus coated or applied and the rolling surfaces 430a and 430b for the bearings on the first shaft 130 are polished simultaneously while rotating the first shaft 130, and then the positional information is recorded onto the magnetic material 411b thus polished. In this manner, the code plate 411 integral with the first shaft 130 can be provided.

In this embodiment as well, the rolling surfaces 430a and 430b and the outer peripheral face of the code plate 411 are formed to have co-axial relation.

In the embodiments, the second shaft is secured to the motor, and the rotation from the motor which is reduced by the speed reducing mechanism is output from the first shaft to the external member. However, the first shaft may be secured to the motor, so that the rotation from the motor which is reduced by the speed reducing mechanism is output from the second shaft to the external member. In this case, the present invention can provide the same effect.

According to the present invention, there is provided a speed reducer with rotation detector which can detect the output rotation at high resolving power and high accuracy. Also, the use of this speed reducer with rotation detector enables the full-closed control of the motor to be made at high resolving power and at high accuracy.

What is claimed is:

1. A speed reducer, comprising:

an input shaft for inputting a rotation;

a first shaft in co-axial relation with said input shaft;

a second shaft in co-axial relation with said first shaft and surrounding one end portion of said first shaft to form a space with said first shaft;

a bearing that is interposed between said first shaft and said second shaft, and that maintains the co-axial relation between said first and second shafts while permitting a relative rotation between said first and second shafts;

a speed reducing mechanism that reduces the rate of rotation input into said input shaft when one of said first and second shafts is held stationary, and that outputs a reduced rate of rotation to the other of said first and second shafts; and a rotation detector that detects rotational information of the other of said first and second shafts with respect to said one of said first and second shafts, the rotation detector being placed in said space formed between the first shaft and the second shaft, wherein said rotation detector includes:

a code plate having positional information corresponding to the rotation;

a plurality of detecting portions that detect the positional information of said code plate and that output an electric signal into which said positional information is transformed; and an electronic device having an amplifying system which amplifies a voltage of the electric signal outputted by the plurality of said detecting portions and a removing system by which the influence due to eccentricity of said code plate is removed from the electric signal outputted by the plurality of said detecting portions.

2. A speed reducer with rotation detector according to claim 1, wherein said code plate and said detecting portion are respectively supported by said first shaft and said second shaft when said second shaft is held stationary and said first shaft serves as an output shaft.

3. A speed reducer with rotation detector according to claim 1, wherein said electronic device comprises a multiplying system which multiplies the frequency of the electric signal outputted by said detecting portion.

4. A speed reducer with rotation detector according to claim 1, wherein said electric device comprises a signal retention system which retains an electric signal outputted by said detecting portion.

5. A speed reducer with rotation detector according to claim 1, further comprising:
   a seal interposed between said first shaft and said second shaft, wherein said seal partitions said space formed between said first shaft and said second shaft to prevent the foreign matter from sticking to said rotation detector.

6. A speed reducer with rotation detector according to claim 2, wherein said code plate has an external peripheral face on which said positional information is provided, and a first shaft mounting face formed co-axially with said external peripheral face and having said first shaft mounted uniaxially, and said first shaft has a rolling face for rolling said bearing, and a code plate mounting face formed co-axially with said rolling face on which said code plate is mounted uniaxially.

7. A speed reducer with rotation detector according to claim 1, wherein said code plate is partially made from aluminum.

8. A speed reducer with rotation detector according to claim 1, wherein said code plate is formed by directly applying a magnetic material onto said first shaft.

9. A speed reducer, comprising:
   an input shaft for inputting a rotation;
   a first shaft in co-axial relation with said input shaft, said first shaft having at least one first bearing rolling surface and a code plate, said code plate having positional information on an outer peripheral face;
   a second shaft in co-axial relation with said first shaft and surrounding one end portion of said first shaft to form a space with said first shaft, said second shaft having at least one second bearing rolling surface;
   a rolling element that is held between the first and second bearing rolling surfaces;
   a speed reducing mechanism that transmits said rotation of said input shaft to said second shaft when said first shaft is held stationary; and
   a rotation detector including a detecting portion and said code plate that is accommodated in said space formed between the first shaft and the second shaft, said detecting portion detecting relative rotation information between said first and second shafts from said outer peripheral face of said code plate.

10. A speed reducer with rotation detector according to claim 9, wherein said code plate is integrally formed on the first shaft.

11. A speed reducer with rotation detector according to claim 9, wherein an external peripheral face of said code plate is co-axial with respect to the first bearing rolling surface.

12. A speed reducer with rotation detector according to claim 9, wherein said code plate is partially made from aluminum.

13. A speed reducer according to claim 12, wherein said code plate is formed by directly applying a magnetic material onto the aluminum portion of said code plate.

14. A speed reducer, comprising:
   an input shaft for inputting a rotation;
   a first shaft in co-axial relation with said input shaft;
   a second shaft in co-axial relation with said first shaft and surrounding one end portion of said first shaft to form a space with said first shaft;
   a bearing that is interposed between said first shaft and said second shaft, and that maintains the co-axial relation between said first and second shafts while permitting a relative rotation between said first and second shafts;
   a speed reducing mechanism that reduces a rate of rotation input into said input shaft when one of said first and second shafts is held stationary, and that outputs the reduced rate of rotation to the other of said first and second shafts; and
   a rotation detector that detects positional information of the other of said first and second shafts with respect to said one of said first and second shafts, the rotation detector being placed in said space formed between the first shaft and the second shaft, wherein:
   said rotation detector includes a code plate having the positional information corresponding to the rotation;
   said code plate being supported by the first shaft, and formed with an outer peripheral face having the positional information; and
   said first shaft having a rolling surface for rolling contact with said bearing, said rolling surface being formed so that the rolling surface of the first shaft and the outer peripheral face of the code plate are in co-axial relation.

15. A speed reducer with rotation detector according to claim 14, wherein said code plate and said first shaft are formed integrally with each other.

\* \* \* \* \*